Oct. 26, 1937.   V. H. HANCOCK   2,097,369
OPTICAL LENS
Filed Jan. 11, 1937
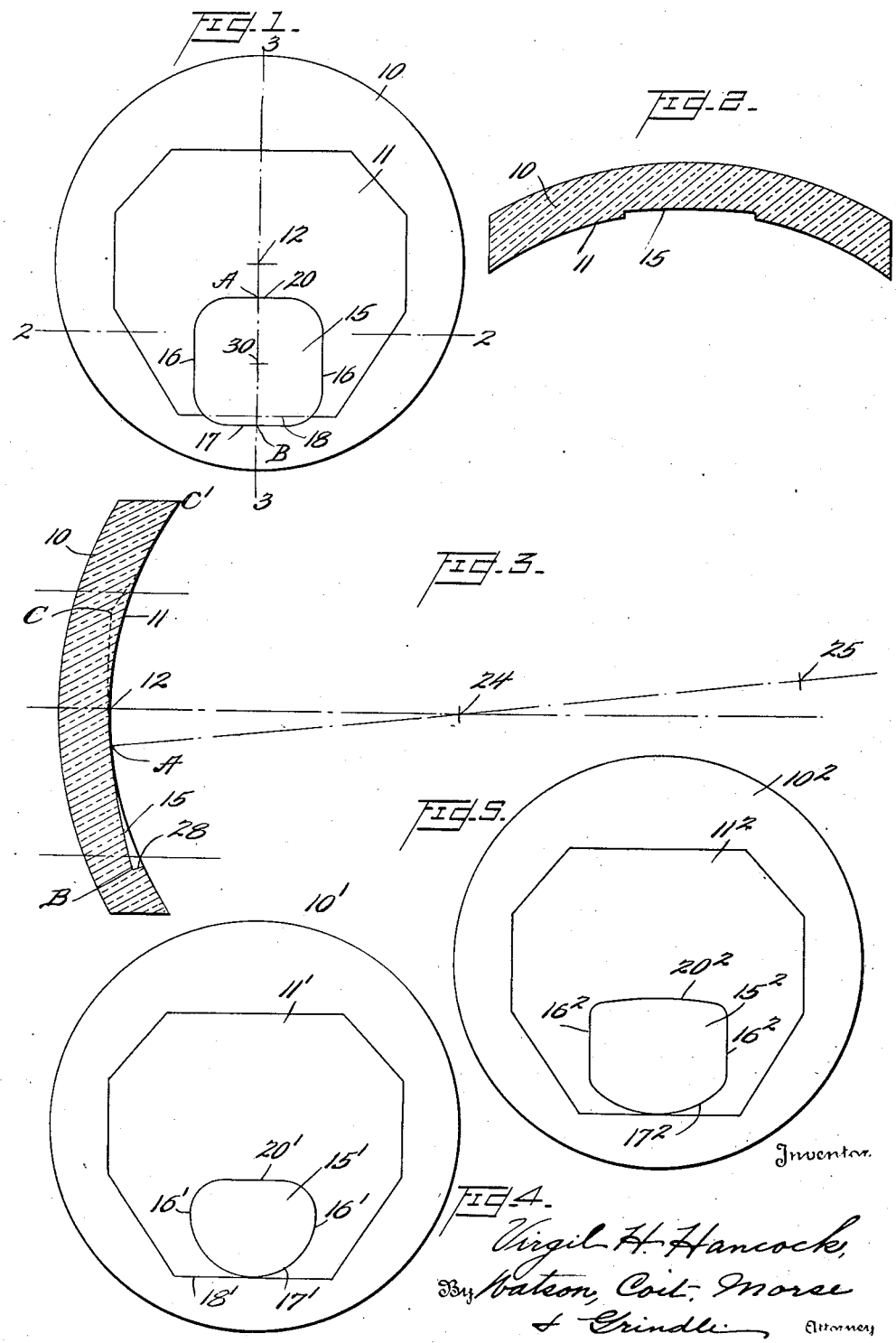

Patented Oct. 26, 1937

2,097,369

UNITED STATES PATENT OFFICE 2,097,369

OPTICAL LENS

Virgil H. Hancock, New Orleans, La.

Application January 11, 1937, Serial No. 120,088

1 Claim. (Cl. 88—54)

This invention relates to ophthalmic lenses and has particular relation to an improved construction of lenses of the one-piece, homogeneous, multifocal type, in contrast to the fused, welded, embedded, or cemented type.

The general object of the present invention is the provision of a multifocal lens of this type which will embody a near vision portion of most efficient design and shape for the convenience of the wearer and which will permit the wearer to read with a minimum of displacement and distortion of his line of vision, and which at the same time will be free of any light reflecting and vision obstructing hump or dirt collecting shoulder at the point of transition of the visual line from the distant into the near vision portion.

A further important object of the invention is the provision of a multifocal lens of one-piece homogeneous construction which may be more economically manufactured than other multifocal lenses due to the reduced amount of labor and materials required, thereby bringing improved vision to a larger number of persons in the strata of lower purchasing power.

Prior multifocal lenses have been subject to numerous deficiencies, among which may be mentioned the following. The near vision portions are circular or approximately so, being bounded by an arc of small radius. The fused or embedded type made of a plurality of separate glasses having different indices of refraction are costly and the losses occurring during the numerous operations to which they are subjected during manufacture render them very expensive. They are also subject to a certain amount of chromatic aberration in the near vision or reading portions. Even the one-piece lenses now extant are characterized by the presence of a hump or shoulder at the upper margin of the near vision area which varies in height from one-half to three millimeters, and not only collects dirt but causes an annoying reflection of light and a dangerous obstruction of vision. Furthermore, in these bifocals, in most cases, the optical center of the near vision portion is situated some distance below the upper boundary of the near vision area, and frequently occurs at a point outside of the finished lens; this condition actually creating a downward torsion on the extrinsic muscles of the eye when reading.

In its preferred embodiment, the present invention contemplates the provision of an ophthalmic lens of the multifocal type having a near vision portion which is characterized by the following features, although it is to be understood that the invention is not to be limited by the inclusion of all of these features, but only as set forth in the subjoined claims: (1) a straight or substantially horizontal upper margin to permit a full, wide sweep of the eye across the near vision portion immediately the line of vision enters this portion from the distant vision portion of the lens; (2) a horizontal dimension at the top of the near vision portion of approximately eighteen millimeters, which would accommodate the eye to a full line of typing on a page of the usual dimensions; (3) substantially parallel and vertical side margins to correspond with the margins of the page of reading matter; (4) a straight or horizontal lower boundary in order to accommodate the full sweep of the eye at the lower portion of the lens as in the case of the upper portion, thus enabling the eye to sweep across the lower part of a page of reading matter with as great convenience as in reading the first lines of the page; (5) a substantial coincidence between the optical center of the near vision or reading portion of the lens and its upper boundary in order to eliminate the sudden displacement or jump of the image at the point of transition of the visual line from the distant into the near vision portion; (6) construction of the near vision portion of glass which is homogeneous with the distant vision portion so that there will be no difference in dispersion and consequently chromatic aberration will be eliminated; and (7) the elimination of any light reflecting hump, depression, or dirt collecting shoulder at the upper boundary of the near vision portion at the point of transition of the line of vision.

Thus by means of the present invention, there may be provided a homogeneous, one-piece, multifocal lens substantially square in shape and having the optical center of the near vision portion substantially coincident with the horizontal upper boundary of the near vision portion, or at least between this line and the geometric center of this portion, and having the advantage of a smooth, unbroken, continuous curve centrally of the lens and extending vertically through both the distant and near vision portions.

My improved lenses may be made according to any suitable method and by any suitable apparatus, as, for example, by means of the devices described in the co-pending application of John H. Martin, Serial Number 679,551, or easily effected modifications thereof.

In the drawing:

Figure 1 is a plan view of a lens blank upon which there has been ground a multifocal lens embodying the principles of my invention, and comprising a preferred form thereof;

Figure 2 is a vertical sectional view taken on line 2—2 of Figure 1;

Figure 3 is a vertical sectional view taken on line 3—3 of Figure 1; and

Figures 4 and 5 are views similar to Figure 1, but illustrating two modifications of the lens.

Referring now more particularly to Figures 1, 2, and 3 of the drawing, the reference character 10 indicates generally the ophthalmic glass lens blank upon which the lens is ground. Upon the blank 10 there is initially ground the substantially spherical surface 11 which possesses the necessary optical characteristics of the distant vision portion of the lens, the optical center of which is indicated at 12. The optical center 12 in this case substantially coincides with the geometric center of the entire lens.

The reference numeral 15 indicates a substantially spherical surface ground upon the already formed surface 11 of the blank, which is so designed as to produce the increased refractive power necessary to provide the near vision or reading portion of the lens. The near vision portion in this embodiment of the invention is substantially square in outline, having slightly rounded corners. The side edges of this portion are parallel and are indicated at 16. The lower edge 17 of this portion, in this particular example, is without the confines of the finished lens, as clearly shown in Figure 1 of the drawing, the lower horizontal line 18 indicating the boundary of the completed lens.

The upper margin 20 of the near vision portion of the lens is a straight horizontal line and, as clearly shown in Figure 3 of the drawing, the two surfaces 11 and 15 merge at this line 20; and, at least adjacent the central point indicated at A, there is no apparent line of division between the two portions of the lens, the vertical surface line of the entire lens forming a substantially continuous curve from top to bottom.

In Figure 3 the radii of curvature of the two lenses are indicated diagrammatically, the center of curvature of the distant portion 11 being indicated at 24 and the center of curvature of the superimposed near vision portion 15 being indicated at 25. Obviously then, the axis of the distant vision portion coincides with the line 12—24.

It will be seen that in the arrangement shown in Figure 3, the point A which is the optical center of the near vision portion 15 is located on the line 20, which comprises the upper margin of the near vision portion. The arc AB indicates the actual curvature of the near vision portion, and the arc AC indicates the prolongation or projection of this arc into the distant portion of the lens; the arc AC', however, indicating the actual curvature of the upper portion of the lens. The final vertical central curvature of the completed bifocal lens comprises the arc BAC', with a gentle merging of the two portions at the point A.

O course, the lower part of the near vision portion of the lens will be depressed below the surface 11 to some extent and provide a shoulder 28 in the lens blank, but this shoulder will ordinarily be cut away in the edged lens as indicated in Figures 1 and 3; or, if retained in the finished lens, will have little or no effect upon the eye, since there will seldom be any necessity of the eye passing laterally from the lowermost portion of the reading portion of the lens to the distant portion.

The horizontal upper margin or boundary line 20 of the near vision portion 15 may logically be called the transition line or transition boundary of the lens. At this point, as has already been explained, the lens portions merge gradually without a shoulder or hump and form a continuous curve vertically and centrally of the bifocal lens.

Preferably the arc CAB is generated from the center of curvature 25 situated beyond and above the center of curvature 24 of the distant portion 11 and upon a line projected through the center of curvature 24 from the point A on the transition boundary 20, which results in the optical center of the near vision portion being disposed at point A. However, instead of being placed at point A on the transition boundary 20, the optical center of the near vision portion may be disposed at any point between the optical center of the distant vision portion and the geometric center 30 of the near vision portion and still obtain visual results much more satisfactory than obtainable through bifocal lenses of the prior art.

In Figure 4 of the drawing, there is illustrated a variant form of the invention comprising a blank 10' in which the upper boundary 20' between the distant portion 11' and the somewhat oval shaped near vision portion 15' is a substantially straight horizontal line, but merges at its ends with the curved lateral edges 16', the lower boundary 17' of the near vision portion being arcuate, and, in this case, tangent to the lower edge 18' of the lens. This form of the invention answers most of the qualifications enumerated and falls within the scope of the invention in its broader aspects.

In Figure 5 of the drawing, there is illustrated a still further embodiment of the invention in which there is provided upon the blank $10^2$ the substantially spherical distant surface $11^2$ and the near vision surface $15^2$. The near vision area in this embodiment is provided with a slightly arcuate upper surface $20^2$ which has a radius of curvature greater than twice the radius of curvature of the arcuate lower boundary $17^2$ of the portion $15^2$. The lateral boundaries $16^2$ are substantially straight, parallel lines as in the first embodiment described. This embodiment, while answering to most of the qualifications which have been enumerated, may find some preference among users over the two previously described embodiments, and obviously falls within the broad scope of the invention.

It will be understood that various changes and modifications may be made in the embodiments ilustrated and described herein without departing from the scope of the invention as defined by the following claim.

Having thus described the invention, what is claimed as new and desired to be secured by Letters Patent is:

A one-piece bifocal lens blank comprising a distant vision portion and a near vision portion of different radii of curvature, said near vision portion having a substantially horizontal top boundary; a relatively smooth unbroken surface extending centrally and vertically of the blank; and the opposite boundary of the near vision portion being at a level other than that of the major lens blank; the center of curvature of the near vision portion being above the center of curvature of the distant vision portion; the axis of the distant vision portion being above the horizontal top boundary of the near vision portion; and the optical center of the near vision portion lying substantially upon the horizontal top boundary, and upon a straight line passing through the two said centers of curvature.

VIRGIL H. HANCOCK.